United States Patent
Nix et al.

(10) Patent No.: US 11,627,286 B2
(45) Date of Patent: *Apr. 11, 2023

(54) VEHICULAR VISION SYSTEM WITH ACCELERATED DETERMINATION OF ANOTHER VEHICLE

(71) Applicant: MAGNA ELECTRONICS INC., Auburn Hills, MI (US)

(72) Inventors: Axel Nix, Birmingham, MI (US); Christopher L. Van Dan Elzen, Rochester Hills, MI (US); Carl W. Shonk, Mayville, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,930

(22) Filed: Nov. 22, 2021

(65) Prior Publication Data
US 2022/0086398 A1    Mar. 17, 2022

Related U.S. Application Data

(63) Continuation of application No. 17/248,631, filed on Feb. 1, 2021, now Pat. No. 11,184,585, which is a (Continued)

(51) Int. Cl.
*H04N 7/18*  (2006.01)
*G08G 1/16*  (2006.01)
*B60R 1/00*  (2022.01)

(52) U.S. Cl.
CPC .............. *H04N 7/18* (2013.01); *B60R 1/00* (2013.01); *G08G 1/161* (2013.01); *G08G 1/166* (2013.01);
(Continued)

(58) Field of Classification Search
CPC .. B60R 2300/301; B60R 1/00; G05D 1/0246; G08G 1/16
See application file for complete search history.

(56) References Cited

U.S. PATENT DOCUMENTS

| 4,987,357 A | 1/1991 | Masaki |
| 5,001,558 A | 3/1991 | Burley et al. |

(Continued)

FOREIGN PATENT DOCUMENTS

EP    947963 A1 * 10/1999 ........... G07C 5/0891

*Primary Examiner* — Kyle M Lotfi
(74) *Attorney, Agent, or Firm* — Honigman LLP

(57) ABSTRACT

A vehicular sensing system includes a data processor disposed at a vehicle, a camera disposed at an in-cabin side of the vehicle windshield, and a range sensor disposed at the vehicle and having a field of sensing that overlaps a portion of the field of view of the camera. During a driving maneuver of the vehicle, the system detects another vehicle that is located within the radar sensors field of sensing and outside of the camera's field of view and determines movement of the range sensor-detected other vehicle relative to the vehicle. When the range sensor-detected other vehicle enters the field of view of the camera, the system, at least in part via processing at the data processor of image data captured by the camera, determines that the range sensor-detected other vehicle is an object of interest. A system output is provided for use by a driving assist system.

26 Claims, 3 Drawing Sheets

Related U.S. Application Data continuation of application No. 16/833,749, filed on Mar. 30, 2020, now Pat. No. 10,911,721, which is a continuation of application No. 13/848,796, filed on Mar. 22, 2013, now Pat. No. 10,609,335.

(60) Provisional application No. 61/700,932, filed on Sep. 14, 2012, provisional application No. 61/614,880, filed on Mar. 23, 2012.

(52) U.S. Cl.
CPC ........ *G08G 1/167* (2013.01); *B60R 2300/301* (2013.01); *B60R 2300/50* (2013.01)

(56) References Cited

U.S. PATENT DOCUMENTS

| | | |
|---|---|---|
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,201,642 B1 | 3/2001 | Bos |
| 6,223,114 B1 | 4/2001 | Boros et al. |
| 6,266,082 B1 | 7/2001 | Yonezawa et al. |
| 6,266,442 B1 | 7/2001 | Laumeyer et al. |

(56) References Cited

U.S. PATENT DOCUMENTS

| | | |
|---|---|---|
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,326,915 B1 | 12/2001 | Chen et al. |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,693,517 B2 | 2/2004 | McCarthy et al. |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjonell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisei et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,580,795 B2 | 8/2009 | McCarthy et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam |
| 8,026,842 B2 | 9/2011 | Fox et al. |
| 8,027,029 B2 | 9/2011 | Lu et al. |
| 8,106,755 B1* | 1/2012 | Knox .................. G01S 13/867 |
| | | 340/439 |
| 8,179,281 B2 | 5/2012 | Strauss |
| 8,849,495 B2 | 9/2014 | Chundrik, Jr. et al. |
| 8,947,532 B2 | 2/2015 | Augst |
| 10,609,335 B2 | 3/2020 | Nix et al. |
| 10,911,721 B2 | 2/2021 | Nix et al. |
| 11,184,585 B2 | 11/2021 | Nix et al. |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0126738 A1* | 6/2006 | Boice .................. G01S 3/7862 |
| | | 348/E7.086 |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0073473 A1 | 3/2007 | Altan et al. |
| 2007/0075892 A1 | 4/2007 | Horibe |
| 2007/0104476 A1 | 5/2007 | Yasutomi et al. |
| 2007/0244643 A1 | 10/2007 | Tengler et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0231433 A1* | 9/2009 | Grigsby ................ G06V 20/40 |
| | | 348/E9.006 |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2009/0268033 A1 | 10/2009 | Ukita |
| 2010/0020170 A1 | 1/2010 | Higgins-Luthman et al. |
| 2010/0228437 A1 | 9/2010 | Hanzawa et al. |
| 2012/0035846 A1 | 2/2012 | Sakamoto et al. |
| 2012/0044066 A1 | 2/2012 | Mauderer et al. |
| 2012/0062743 A1 | 3/2012 | Lynam et al. |
| 2012/0116632 A1* | 5/2012 | Bechtel ................ H04N 5/2254 |
| | | 701/1 |
| 2012/0218412 A1 | 8/2012 | Dellantoni et al. |
| 2012/0262340 A1 | 10/2012 | Hassan et al. |
| 2012/0313806 A1 | 12/2012 | Katoh |
| 2013/0124052 A1 | 5/2013 | Hahne |
| 2013/0129150 A1 | 5/2013 | Saito |
| 2013/0131918 A1 | 5/2013 | Hahne |
| 2013/0222592 A1 | 8/2013 | Gieseke |
| 2013/0242284 A1* | 9/2013 | Zeng .................... G01S 17/931 |
| | | 356/4.01 |
| 2013/0253796 A1 | 9/2013 | Luo et al. |
| 2014/0067206 A1 | 3/2014 | Pflug |
| 2014/0156157 A1 | 6/2014 | Johnson et al. |
| 2014/0218529 A1 | 8/2014 | Mahmoud et al. |
| 2014/0222280 A1 | 8/2014 | Salomonsson et al. |
| 2014/0313339 A1 | 10/2014 | Diessner |
| 2014/0375476 A1 | 12/2014 | Johnson et al. |
| 2014/0379233 A1 | 12/2014 | Chundrlik, Jr. et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |

\* cited by examiner

VEHICULAR VISION SYSTEM WITH ACCELERATED DETERMINATION OF ANOTHER VEHICLE

CROSS REFERENCE TO RELATED APPLICATIONS

The present application is a continuation of U.S. patent application Ser. No. 17/248,631, filed Feb. 1, 2021, now U.S. Pat. No. 11,184,585, which is a continuation of U.S. patent application Ser. No. 16/833,749, filed Mar. 30, 2020, now U.S. Pat. No. 10,911,721, which is a continuation of U.S. patent application Ser. No. 13/848,796, filed Mar. 22, 2013, now U.S. Pat. No. 10,609,335, which claims the filing benefit of U.S. provisional applications, Ser. No. 61/700,932, filed Sep. 14, 2012, and Ser. No. 61/614,880, filed Mar. 23, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides communication/data signals, including camera data or image data, that may be displayed at a display screen that is viewable by the driver of the vehicle, such as when the driver is backing up the vehicle, and/or that may be processed and, responsive to such image processing, the system may detect an object at or near the vehicle and in the path of travel of the vehicle, such as when the vehicle is backing up or driving forward along a road. The system is operable to detect objects or receive information about objects that are outside of the field of view of the camera, such that, when the object or vehicle moves to within the field of view of the camera, the image processor may more quickly detect and confirm detection of the object or vehicle in the imaged scene.

According to an aspect of the present invention, a vision system for a vehicle includes a camera or image sensor disposed at a vehicle and having a field of view exterior of the vehicle (such as a forward field of view in the forward direction of travel of the vehicle), and a processor operable to process data captured by the camera. At least one device or sensor or element (such as, for example, a radar sensor and/or an element of a vehicle-to-vehicle communication system and/or an element of a vehicle-to-infrastructure communication system or the like) is operable to detect objects that are present forward of the vehicle and outside of the forward field of view of the camera. Responsive to detection of the object by the at least one device being indicative of the object about to enter the forward field of view of the camera, the image processor anticipates the object entering the forward field of view of the camera and wherein, upon entering of the forward field of view of the camera by the object, the image processor detects the object.

Optionally, a vehicle interface processor may receive communication from the at least one device (such as via a serial data bus of the vehicle or the like) and may receive tracking information from the image processor, whereby the vehicle interface processor may communicate hypothesis information to the image processor for accelerated object confirmation.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to detect objects forward of the vehicle for a collision avoidance feature or to assist a driver of the vehicle in maneuvering the vehicle in a rearward direction. The vision system includes a processor that is operable to receive image data from one or more cameras and may provide a displayed image.

Figure 1:
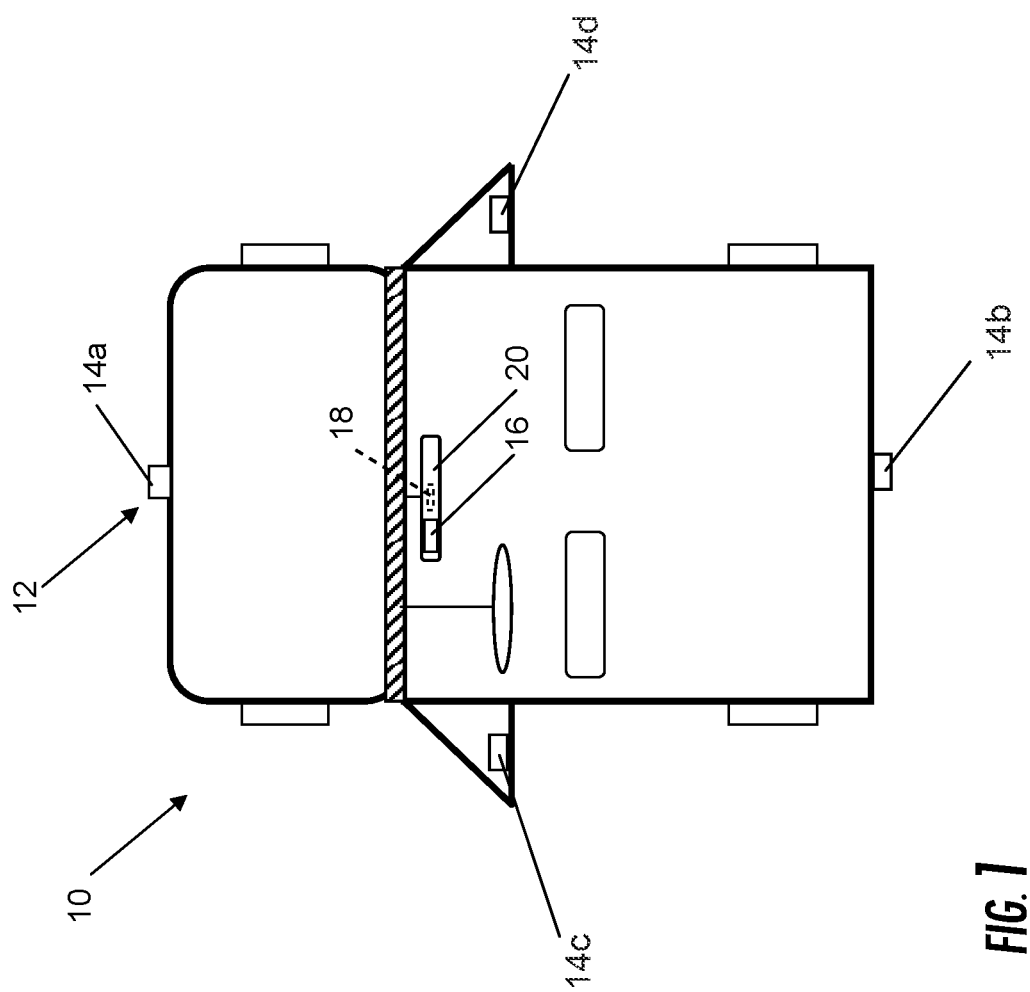
FIG. 1 is a plan view of a vehicle with a vision system and imaging sensors or cameras that provide exterior fields of view in accordance with the present invention.
Figure 3:
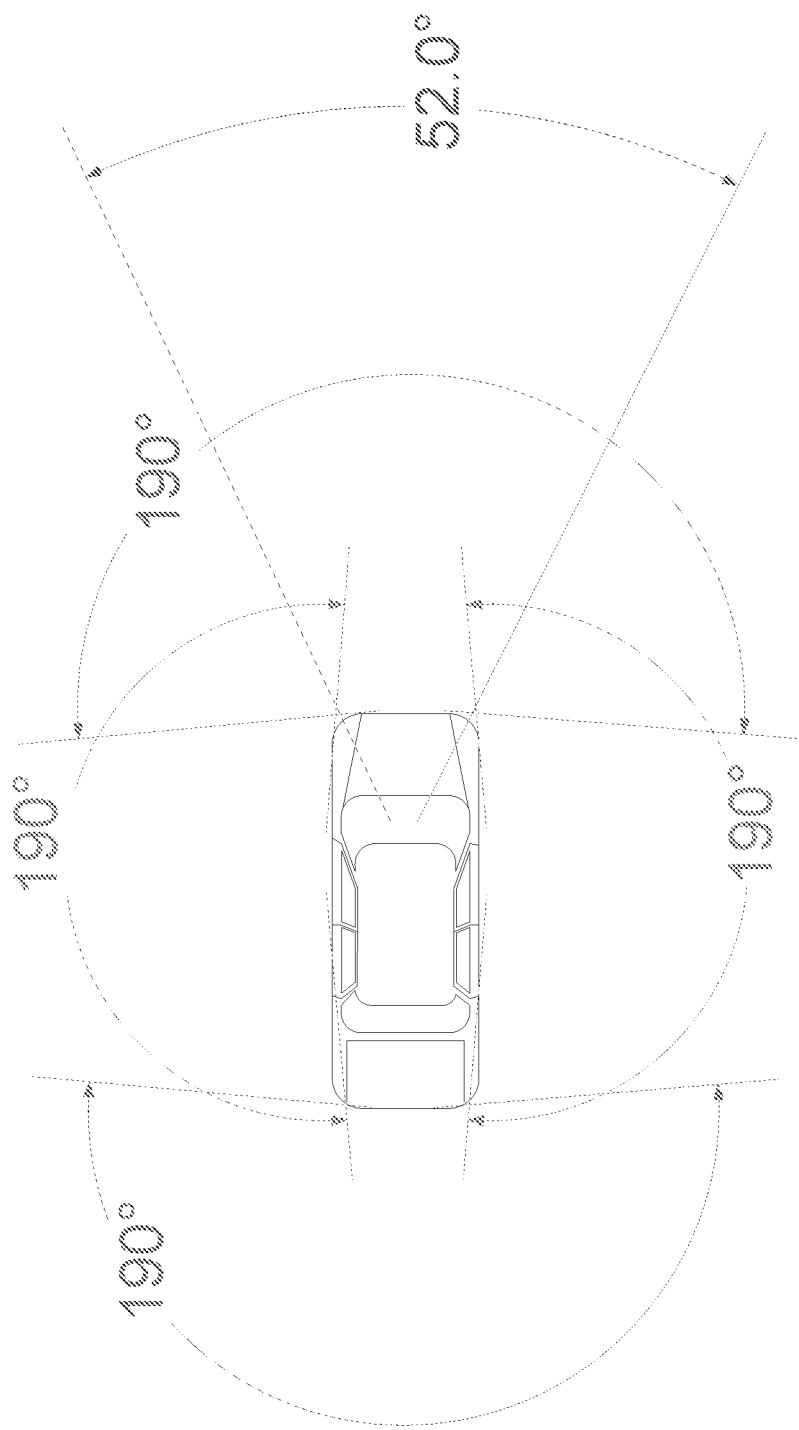
FIG. 3 is a schematic plan view of a vehicle, showing the fields of view of the cameras disposed at the front, rear and sides of the vehicle.

Referring now to the drawings and the illustrative embodiments depicted therein, a vehicle 10 includes an imaging system or vision system 12 that includes a forward facing imaging sensor or camera 14a at the front (or at the windshield) of the vehicle (and that optionally may include multiple exterior facing imaging sensors or cameras, such as a rearward facing imaging sensor or camera 14b, and sidewardly/rearwardly facing cameras 14c, 14d at respective sides of the vehicle), which captures images exterior and forwardly of the vehicle, with the camera (or cameras) having a lens for focusing images at or onto an imaging array or imaging plane of the camera (FIG. 1). The fields of view of the multiple cameras (such as can be seen with reference to FIG. 3) thus may encompass the regions ahead of and rearward of and sideward of the vehicle, with overlapping regions at the corners of the vehicle, thus providing a surround view vision system for the vehicle having 360 degree sensing capability around the vehicle. The vision system 12 includes a control or processor 18 that is operable to process image data captured by the camera and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Figure 2:
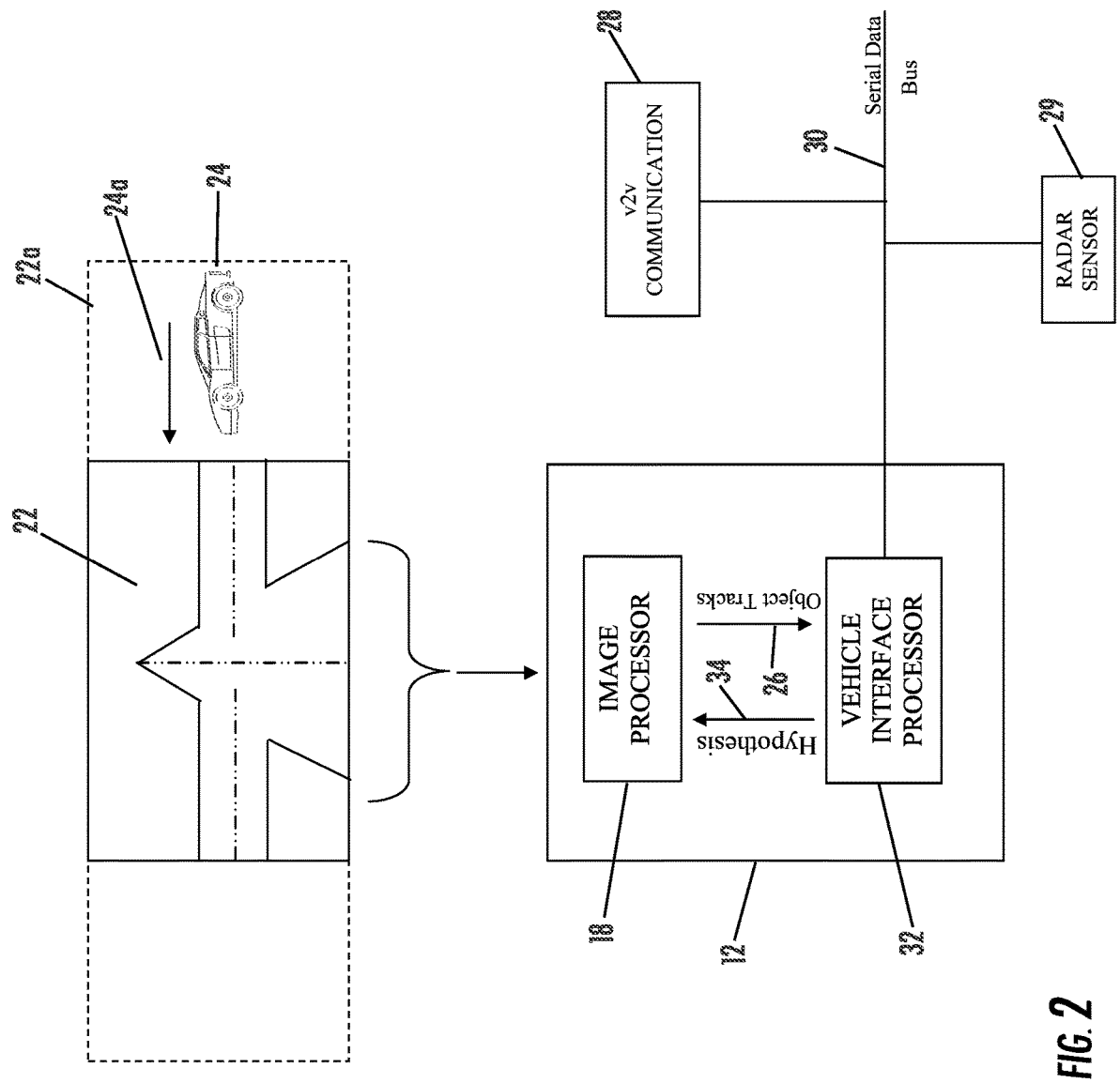
FIG. 2 is a schematic of the vision system of the present invention.

As shown in FIG. 2, the automotive front facing camera system 12 comprises an image processor 18 which processes image data captured by a camera that is representative of a scene 22 in front of the vehicle 10 (and within the field of view of the forward facing camera). The image processor 18 processes the captured image data to detect objects or vehicles present within the imaged scene 22, and reports tracks of detected objects or vehicles that are present within the imaged scene 22. Optionally, and desirably, the reported tracks 26 may be filtered using a hypothesis and confirmation approach, such as, for example, by using a Kalman filter or the like.

Camera system 12 is in communication with devices or sensors 28, 29, such as through a serial data bus 30 or the like. These devices or sensors 28, 29 may comprise any suitable sensing and/or communication means, such as, for example, an element of a vehicle-to-vehicle (v2v) communication system 28 (or a vehicle-to-infrastructure (v2x) or the like) and/or a radar sensor 29 and/or the like. The sensor or v2v communication system 28 and the radar sensor 29 are configured to provide information about vehicles 24 that are within an peripheral area 22a outside of scene 22 and outside of the field of view of the camera (including information pertaining to a direction of movement 24a of any detected vehicles in the peripheral scene).

In vehicle-to-vehicle (v2v) and vehicle-to-infrastructure telematic systems, connected vehicles interact with each other (v2v), the roadside (v2i) and beyond (v2x) via wireless communications, such as, for example, a 3G/4G Cellular communication, a Wi-Fi communication and a 5.9 GHz Dedicated Short Range Communication (DSRC) or the like, to provide the likes of situation awareness, collision avoidance and post-crash assistance to drivers of vehicles on the road or to other people or services or the like.

Information about a vehicle or vehicles or objects 24 present within the peripheral area 22a is communicated to forward facing camera system 12 through a vehicle interface processor or microprocessor 32. The vehicle interface processor 32 is in communication with image processor 18, such as via any suitable communication means, such as, for example, through a UART or SPI interface or other serial interface or the like. To accelerate confirmation of tracks 22, vehicle interface processor 32 communicates hypothesis information 34 to image processor 18. Hypothesis information 34 is used to "prime" the filters in image processor 18 for accelerated object confirmation. Hypothesis information 34 is derived from information gleaned from v2v communication system 28 or radar sensor 29.

For example, the radar sensor may have a field of sensing and range that encompasses a side and forward region ahead of the vehicle and that may or may not encompass or overlap at least a portion of the forward field of view of the camera, and the system may, responsive to an output of the radar sensor, determine if an object or vehicle is present in the radar sensor's sensing area and if the detected object or vehicle may enter the forward field of view of the forward facing camera. Similarly, a v2v communication system (or v2x communication system or the like) may communicate information about another vehicle that is outside of the forward field of view of the forward facing camera, particularly if the direction of travel of the other vehicle is towards the predicted path (and thus approaching the forward field of view of the forward facing camera) of the subject or host or equipped vehicle. The system may receive such information or communication from the radar and/or v2v system and/or other sensor or system, and the image processor may consider the information to provide enhanced or rapid confirmation of an object or vehicle that enters the camera's forward field of view.

Thus, the system (using auxiliary sensors or radar sensors or v2v communications or the like) may operate to detect or determine that a vehicle is present in a peripheral scene (outside of the field of view of the forward facing camera) and may determine that the detected vehicle is moving toward the field of view of the camera and may be an object of interest to the vision system and/or the driver of the vehicle. Optionally, the system may utilize navigation data (such as derived from a navigation system or device of the vehicle), to further optimize the performance of the system. The system may communicate such information to the image processor so that the image processor, when it first detects an object at a side or perimeter region of the field of view of the camera, may readily confirm that the detected object is the object or vehicle that was previously detected by the other sensors. The present invention thus provides enhanced confirmation of vehicles or objects of interest that are present in the forward field of view of the camera, based on an initial detection of the vehicles or objects before they enter the field of view of the camera. Although shown and described as a imaging system with a forward facing camera, aspects of the present invention are applicable to imaging systems with a rearward facing camera as well (such as a rear backup assist camera or the like).

Optionally, the vehicle imaging or vision system may utilize a recycling buffer or video recording device or storage device that may be operable to continuously store video captured by one or more cameras of the vehicle for a running loop of a predetermined amount of seconds or minutes (such as a continuous storing of video captured over the previous 30 seconds or the like, while overwriting or over-storing video over stored or recorded video from before the predetermined time period) while the vehicle is powered on. If the vehicle is involved in an accident, the vision system and camera may receive a signal (such as via a CAN or LIN bus of the vehicle) that would tell the camera or vision system to save video images that were captured over the last "x" seconds (such as at least about 10 seconds, more preferably at least about 20 seconds, or more or less) and to continue to record and save video images for another "y" seconds (such as at least about 10 seconds, more preferably at least about 20 seconds, or more or less).

The signal may be generated and communicated in response to any suitable triggering event, such as responsive to an airbag of the vehicle being deployed, or responsive to an output of an accelerometer of the vehicle (that may be indicative of a crash or sudden stop of the vehicle) or responsive to actuation of a user input by the driver, or responsive to any other triggering event or signal that may be indicative of a collision or accident detection. The system may also record (for example, responsive to an airbag deployment) other data, such as, for example, braking forces, steering wheel angle impact direction and/or the like. The video storage (such as, for example, at least around 20 seconds or thereabouts) thus may document accident circumstances in addition to the other data. Having such video images captured may, if evidence of the non-fault of the driver of the vehicle, help the driver avoid a ticket and points on their license, if involved in an accident.

Optionally, the video recording and storage function may operate as part of a vehicle security system, whereby video images may be captured and recorded responsive to certain triggers that are indicative of a security situation. For example, if the vehicle security system is triggered, the video recording may be activated and about 30 seconds (for example) of video may be recorded (or more or less time of recording). Optionally, for example, the video recording may start recording and storing video images responsive to a detection of a forced entry (or entry without use of the key fob or the like).

Optionally, the stored recording may be accessed via any suitable display device, such as via a smart phone or other technologies. Thus, if the vehicle is stolen, the owner of the vehicle may access the vision system remotely and determine how the vehicle was stolen. Such a system may also provide the option of accessing the video images in real time to determine where the stolen vehicle is at that time. The recorded video images or data may also or otherwise be transmitted to a remote receiver or device, such as a land based device. Optionally, when the vehicle security system is triggered, the vision system may communicate an alert or signal to the user's smart phone or other device to alert the owner of the vehicle that the vehicle is being stolen or the like.

Such a vehicular camera and vision system that has a circular video buffer and/or a wireless link to the outside world may have many applications, where a user can access the vision system remotely (such as via a wireless communication or remote communication device) and may cause the system to begin capturing and storing video images and/or may view images as they are captured by the vision system. Optionally, the system may utilize GPS-derived position data and time, whereby the current geographical location of the vehicle may be communicated or the last known vehicle location (such as the last known vehicle position in situations where the GPS system is deactivated or jammed otherwise not receiving a signal) such that the vehicle, if stolen, can be tracked by the user or owner or police or the like.

Optionally, for example, the vision system may provide a personal security function to allow a user to access the vision system remotely to view the area around the vehicle before approaching the vehicle. For example, a user may, using their smart phone or other remote device, activate a 360 degree camera system of the vehicle to view the surroundings of a vehicle (and optionally to view the interior cabin of the vehicle, such as via a cabin monitoring camera of the vehicle) before entering a parking lot where the vehicle is parked. For example, when a user is going to their parked vehicle late at night (such as at a shopping mall or night club or the like), the user may first access the vision system to determine whether or not it appears safe to enter the parking lot and to approach their vehicle.

Optionally, the vision system may provide a personal recording function, such that the user may actuate a user input to capture video images and/or still photo images of scenery or the like. Such a "tourist" feature may allow a user that, for example, is driving thru the mountains or along a coast line or any other scenic roadway or the like, to capture video of the drive or still photos of a specific scene or the like. Optionally, the video may include date and time information and/or geographical location information (such as responsive to a user input or a GPS system of the vehicle or navigation system of the vehicle or the like).

Other vehicle sensors may also be triggers to actuate the recording function, such as, for example, detection of a parking distance threshold (so that video is recorded when the vehicle is moved within a threshold distance of an object or other vehicle or the like when being parked), illumination and/or the like.

Optionally, in order to save on memory usage, the vision system may adjust the number of frames that are captured per second when operating in a post-accident recording mode or in a post-forced entry recording mode or the like.

Optionally, and with respect to the technology of sign recognition, adaptive cruise control and the like, it is envisioned that these technologies may be adapted to both driven and autonomous vehicles in industrial plants (such as for delivery of components to a station along an assembly line or the like).

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published on Feb. 7, 2013 as International Publication No. WO 2013/019707, and/or PCT Application No. PCT/US2012/048110, filed Jul. 25, 2012, and published on Jan. 31, 2013 as International Publication No. WO 2013/016409, and/or PCT Application No. PCT/CA2012/000378, filed Apr. 25, 2012, and published Nov. 1, 2012 as International Publication No. WO 2012/145822, and/or PCT Application No. PCT/US2012/056014, filed Sep. 19, 2012, and published Mar. 28, 2013 as International Publication No. WO 2013/043661, and/or PCT Application No. PCT/US12/57007, filed Sep. 25, 2012, and published Apr. 4, 2013 as International Publication No. WO 2013/048994, and/or PCT Application No. PCT/US2012/061548, filed Oct. 24, 2012, and published May 2, 2013 as International Publication No. WO 2013/063014, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published on Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2013/022119, filed Jan. 18, 2013, and published Jul. 25, 2013 as International Publication No. WO 2013/109869, and/or PCT Application No. PCT/US2013/027342, filed Feb. 22, 2013, and published Aug. 29, 2013 as International Publication No. WO 2013/126715, and/or U.S. patent applications, Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/733,598, filed Dec. 5, 2012; Ser. No. 61/733,093, filed Dec. 4, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/613,651, filed Mar. 21, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published on Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published on Nov. 1, 2012 as International Publication No. WO 2012/145822, and/or PCT Application No. PCT/US2012/066571, filed Nov. 27, 2012, and published on Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2013/022119, filed Jan. 18, 2013, and published Jul. 25, 2013 as International Publication No. WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos.

7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular sensing system, said vehicular sensing system comprising:

a data processor disposed at a vehicle equipped with said vehicular sensing system;

a camera disposed at an in-cabin side of a windshield of the equipped vehicle and having a field of view through the windshield exterior and at least forward of the equipped vehicle, wherein said camera comprises a CMOS imaging array sensor;

wherein said camera is operable to capture image data;

wherein image data captured by said camera is provided to said data processor, and wherein image data captured by said camera and provided to said data processor is processed at said data processor;

a range sensor disposed at the equipped vehicle and having a field of sensing at least forward of the equipped vehicle;

wherein the field of sensing of said range sensor overlaps a portion of the field of view of said camera;

wherein, during a driving maneuver of the equipped vehicle, and responsive at least in part to sensor data captured by said range sensor, said vehicular sensing system detects an object that is located within the field of sensing of said range sensor and outside of the field of view of said camera and determines movement of the range sensor-detected object relative to the equipped vehicle;

wherein, during the driving maneuver of the equipped vehicle and responsive at least in part to sensor data captured by said range sensor, information derived from the sensor data captured by said range sensor when the range sensor-detected object is located within the field of sensing of said range sensor and outside of the field of view of said camera is communicated to said data processor, and wherein the communicated information pertains to the range sensor-detected object;

wherein, when the range sensor-detected object enters the field of view of said camera, said vehicular sensing system, at least in part via processing at said data processor of image data captured by said camera and provided to said data processor and based on the communicated information pertaining to the range sensor-detected object, determines that the range sensor-detected object is another vehicle; and wherein an output of said vehicular sensing system is provided for use by at least one driving assist system of the equipped vehicle.

2. The vehicular sensing system of claim 1, wherein, during the driving maneuver of the equipped vehicle, and responsive at least in part to sensor data captured by said range sensor, said vehicular sensing system determines that the range sensor-detected object is moving relative to the equipped vehicle toward the field of view of said camera.

3. The vehicular sensing system of claim 1, wherein said data processor comprises an image processing chip.

4. The vehicular sensing system of claim 1, wherein said range sensor comprises a radar sensor.

5. The vehicular sensing system of claim 1, wherein said range sensor comprises a lidar sensor.

6. The vehicular sensing system of claim 1, wherein the field of view of said camera is 52 degrees or less forward of the equipped vehicle.

7. The vehicular sensing system of claim 1, wherein the output of said range sensor is provided to at least one selected from the group consisting of (i) a vehicle-to-vehicle communication system and (ii) a vehicle-to-infrastructure communication system.

8. The vehicular sensing system of claim 7, comprising a vehicle interface processor that receives the output of said range sensor and receives an output of said data processor, and wherein said vehicle interface processor communicates hypothesis information to said data processor for determination that the range sensor-detected object is another vehicle.

9. The vehicular sensing system of claim 1, comprising a vehicle interface processor that receives the output of said range sensor and receives an output of said data processor.

10. The vehicular sensing system of claim 9, wherein said vehicle interface processor communicates hypothesis information to said data processor for determination, via processing at said data processor of image data captured by said camera and provided to said data processor, that the range sensor-detected object is another vehicle.

11. The vehicular sensing system of claim 1, wherein the at least one driving assist system of the equipped vehicle comprises an adaptive cruise control system of the equipped vehicle.

12. The vehicular sensing system of claim 1, wherein the at least one driving assist system of the equipped vehicle comprises a lane departure warning system of the equipped vehicle.

13. The vehicular sensing system of claim 1, wherein the at least one driving assist system of the equipped vehicle comprises a headlamp control system of the equipped vehicle.

14. The vehicular sensing system of claim 1, wherein, during the driving maneuver of the equipped vehicle, said vehicular sensing system determines that the range sensor-detected object is moving relative to the equipped vehicle at least in part responsive to a global positioning system.

15. The vehicular sensing system of claim 14, wherein the global positioning system is part of a navigation system of the vehicle.

16. The vehicular sensing system of claim 1, wherein image data captured by said camera is stored in a recycling memory of the vehicle as a continuous running loop of a predetermined time period.

17. A vehicular sensing system, said vehicular sensing system comprising:
- a data processor disposed at a vehicle equipped with said vehicular sensing system;
- a camera disposed at an in-cabin side of a windshield of the equipped vehicle and having a field of view through the windshield exterior and at least forward of the equipped vehicle, wherein said camera comprises a CMOS imaging array sensor;
- wherein said camera is operable to capture image data;
- wherein image data captured by said camera is provided to said data processor, and wherein image data captured by said camera and provided to said data processor is processed at said data processor;
- a radar sensor disposed at the equipped vehicle and having a field of sensing at least forward of the equipped vehicle;
- wherein the field of sensing of said radar sensor overlaps a portion of the field of view of said camera;
- wherein, during a driving maneuver of the equipped vehicle, and responsive at least in part to radar data captured by said radar sensor, said vehicular sensing system detects an object that is located within the field of sensing of said radar sensor and outside of the field of view of said camera and determines movement of the radar-detected object relative to the equipped vehicle;
- wherein, during the driving maneuver of the equipped vehicle and responsive at least in part to radar data captured by said radar sensor, information derived from the radar data captured by said radar sensor when the radar-detected object is located within the field of sensing of said radar sensor and outside of the field of view of said camera is communicated to said data processor, and wherein the communicated information pertains to the radar-detected object;
- wherein, when the radar-detected object enters the field of view of said camera, said vehicular sensing system, at least in part via processing at said data processor of image data captured by said camera and provided to said data processor and based on the communicated information pertaining to the radar-detected object, determines that the radar-detected object is another vehicle;
- wherein an output of said vehicular sensing system is provided for use by at least one driving assist system of the equipped vehicle; and
- wherein the at least one driving assist system of the equipped vehicle comprises a headlamp control system of the equipped vehicle and at least one selected from the group consisting of (i) a lane departure warning system of the equipped vehicle and (ii) an adaptive cruise control system of the equipped vehicle.

18. The vehicular sensing system of claim 17, wherein, during the driving maneuver of the equipped vehicle, and responsive at least in part to radar data captured by said radar sensor, said vehicular sensing system determines that the radar-detected object is moving relative to the equipped vehicle toward the field of view of said camera.

19. The vehicular sensing system of claim 17, wherein said data processor comprises an image processing chip.

20. The vehicular sensing system of claim 17, wherein the output of said radar sensor is provided to at least one selected from the group consisting of (i) a vehicle-to-vehicle communication system and (ii) a vehicle-to-infrastructure communication system.

21. The vehicular sensing system of claim 17, wherein the at least one driving assist system of the equipped vehicle comprises (i) the lane departure warning system of the equipped vehicle and (ii) the adaptive cruise control system of the equipped vehicle.

22. A vehicular sensing system, said vehicular sensing system comprising:
- a data processor disposed at a vehicle equipped with said vehicular sensing system;
- a camera disposed at an in-cabin side of a windshield of the equipped vehicle and having a field of view through the windshield exterior and at least forward of the equipped vehicle, wherein said camera comprises a CMOS imaging array sensor;
- wherein said camera is operable to capture image data;
- wherein image data captured by said camera is provided to said data processor, and wherein image data captured by said camera and provided to said data processor is processed at said data processor;
- a lidar sensor disposed at the equipped vehicle and having a field of sensing at least forward of the equipped vehicle;
- wherein the field of sensing of said lidar sensor overlaps a portion of the field of view of said camera;
- wherein, during a driving maneuver of the equipped vehicle, and responsive at least in part to lidar data captured by said lidar sensor, said vehicular sensing system detects an object that is located within the field of sensing of said lidar sensor and outside of the field of view of said camera and determines movement of the lidar-detected object relative to the equipped vehicle;
- wherein, during the driving maneuver of the equipped vehicle and responsive at least in part to lidar data captured by said lidar sensor, information derived from the lidar data captured by said lidar sensor when the lidar-detected object is located within the field of sensing of said lidar sensor and outside of the field of view of said camera is communicated to said data processor, and wherein the communicated information pertains to the lidar-detected object;
- wherein, when the lidar-detected object enters the field of view of said camera, said vehicular sensing system, at least in part via processing at said data processor of image data captured by said camera and provided to said data processor and based on the communicated information pertaining to the lidar-detected object, determines that the lidar-detected object is another vehicle;
- wherein an output of said vehicular sensing system is provided for use by at least one driving assist system of the equipped vehicle; and
- wherein the at least one driving assist system of the equipped vehicle comprises a headlamp control system of the equipped vehicle and at least one selected from the group consisting of (i) a lane departure warning system of the equipped vehicle and (ii) an adaptive cruise control system of the equipped vehicle.

23. The vehicular sensing system of claim 22, wherein, during the driving maneuver of the equipped vehicle, and responsive at least in part to lidar data captured by said lidar sensor, said vehicular sensing system determines that the lidar-detected object is moving relative to the equipped vehicle toward the field of view of said camera.

24. The vehicular sensing system of claim 22, wherein said data processor comprises an image processing chip.

25. The vehicular sensing system of claim 22, wherein the output of said lidar sensor is provided to at least one selected from the group consisting of (i) a vehicle-to-vehicle communication system and (ii) a vehicle-to-infrastructure communication system.

26. The vehicular sensing system of claim 22, wherein the at least one driving assist system of the equipped vehicle comprises (i) the lane departure warning system of the equipped vehicle and (ii) the adaptive cruise control system of the equipped vehicle.

* * * * *